Feb. 12, 1957  A. G. SLEE  2,781,115
BRAKING SYSTEMS FOR VEHICLES
Filed April 12, 1954
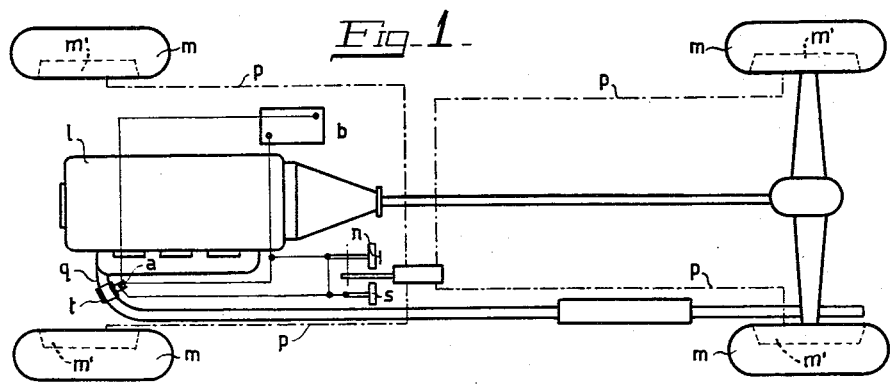
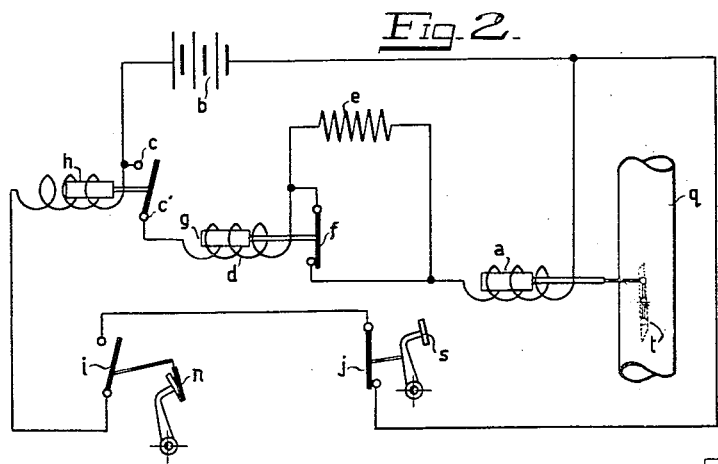
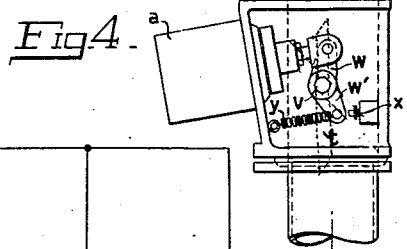
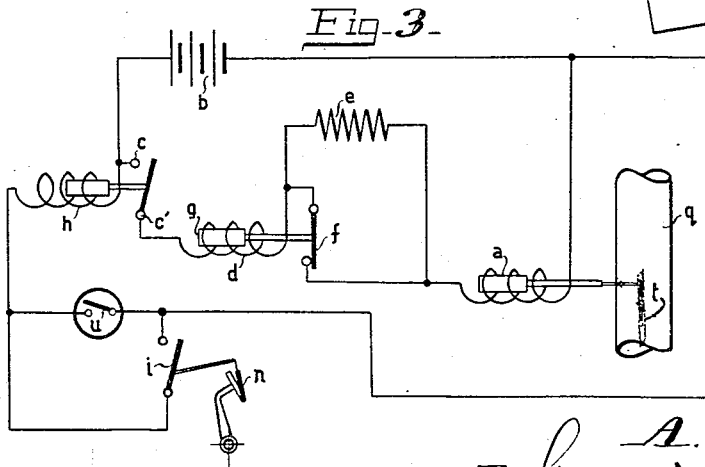
Inventor
A. G. Slee

United States Patent Office 2,781,115
Patented Feb. 12, 1957

2,781,115
BRAKING SYSTEMS FOR VEHICLES

Alfred Graham Slee, Cardiff, Wales, assignor to The British Electric Traction Company Limited, London, England, and Thomas Ash & Company Limited, Birmingham, England Application April 12, 1954, Serial No. 422,606

Claims priority, application Great Britain May 15, 1953

7 Claims. (Cl. 192—.058)

This invention relates to braking systems for vehicles of the kind in which a valve is provided in the exhaust conduit of an internal combustion engine which when closed cuts off or restricts the outlet of gases from the engine so that the latter whilst in driving connection with the road wheels acts as a powerful brake, thus relieving the normal wheel brakes of a substantial part of the work involved in retarding the vehicle and reducing the tendency for skids.

An object of the present invention is to provide improved or simplified systems of this kind.

The invention consists in a braking system of the kind set forth having features as set forth in the claims appended hereto.

Two examples of braking systems according to the present invention will now be described with reference to the accompanying drawings, in which:

Figure 1 shows diagrammatically some of the component parts of a vehicle embodying an exhaust brake according to the invention;

Figure 2 is a circuit showing the electrical connection of one form of brake;

Figure 3 is a circuit diagram of a form embodying certain modifications;

Figure 4 is an enlarged section of the butterfly valve on the exhaust conduit.

Referring to Figure 1, a motor vehicle having an internal combustion engine $l$ and wheels $m$ is provided with the usual brake pedal $n$ actuating friction brakes $m'$ on the four wheels $m$, for example through a system of hydraulic pipes $p$ in a well-known manner. The exhaust gases from the engine $l$ pass through an exhaust conduit $q$. There is the usual battery $b$, and a clutch pedal is shown at $s$. A butterfly valve $t$, shown in greater detail in Figure 4, is mounted in the exhaust conduit $q$ and designed to be closed by a solenoid $a$.

It will be understood that the effect of the valve $t$ is to obstruct the escape of the exhaust gases and turn the engine into a compressor to produce a powerful braking effect on the wheels via the vehicle transmission, in a manner which is in itself well-known.

The electric circuit for energising the solenoid $a$ is shown in Figure 2. It is connected to the battery $b$ through a pair of relay contacts $c$, $c'$, a coil of a further solenoid $d$ and a current-limiting resistor $e$. A normally closed switch $f$ is opened by the plunger $g$ of the further solenoid $d$ and is arranged to introduce resistor $e$ into the circuit. The contacts $c$, $c'$ are arranged to be closed by a solenoid $h$, which is connected to the battery $b$ through a switch $i$ mounted on the brake pedal $n$ and a switch $j$ operated by the clutch pedal $s$. Whereas the switch $i$ closes when the pedal $n$ is depressed, switch $j$ is arranged to open when pedal $s$ is depressed to disengage the clutch.

When pressure is applied to the brake pedal $n$, and before the friction brakes on the wheels $m$ are operated, the switch $i$ closes to energise solenoid $h$, which closes contacts $c$, $c'$ to allow current to flow from battery $b$ through solenoids $d$ and $a$.

Since initially switch $f$ is closed, a heavy current flows through solenoid $a$, which thus exerts a strong force to close valve $t$ in exhaust conduit $q$. After a predetermined time interval however, dependent upon the inductance of solenoid $d$, the switch $f$ will be opened by plunger $g$, thereby connecting the current-limiting resistor $e$ in series with solenoid $a$ to reduce the current subsequently flowing therein. These conditions obtain as long as switch $i$ is closed, and clutch pedal $s$ is not depressed.

Stalling of the engine $l$ is prevented by the provision of the switch $j$ on clutch pedal $s$, which opens the circuit when the pedal is depressed, allowing the solenoids to return to their rest positions and opening valve $t$.

In the modified circuit of Figure 3 is shown a separate manually operable switch $u$ in parallel with the brake-pedal switch $i$. This switch may be operated by the driver of the vehicle, for example when the vehicle is descending a long decline. In the example of Figure 3, the clutch-pedal-operated switch $j$ is omitted since this is not essential.

Referring to Figure 4, the butterfly valve $t$ in exhaust conduit $q$ is pivoted so that, when the valve is closed, the exhaust gas pressure acts on a greater area of the valve in a direction tending to open it than in the other direction. Arrow A shows the direction of flow of the gas.

The offset spindle $v$ of valve $t$ carries a two-armed lever, of which one arm $w$ engages an adjustable stop $x$, and the other arm $w'$ is connected to the plunger of solenoid $a$. Arm $w$ is also connected to a light spring $y$ tending to open valve $t$. In order to prevent the engine from stalling as the vehicle is brought to rest, the stop $x$ may be set to prevent complete closure of the valve.

I claim:

1. In a motor vehicle having wheels, an internal combustion engine, a driving connection between said engine and at least some of said wheels, an exhaust conduit, a butterfly valve in said exhaust conduit, an electromagnetic solenoid connected to said valve, spring means urging said valve towards the open position, a brake pedal, friction braking means operable by said brake pedal, an electric switch on said brake pedal, and an electric battery whereby closure of said switch serves to energise said solenoid from said battery to close said valve, said electric switch being closable before operation of said friction braking means.

2. In a motor vehicle having wheels, an internal combustion engine, an exhaust conduit receiving the exhaust gases from said engine, a driving connection between said engine and at least some of said wheels, a butterfly valve in said exhaust conduit, said butterfly valve being pivotable on a spindle transverse to said conduit in a manner such that the exhaust gases act on a greater area of the valve in a direction tending to open it than in the other direction, an electromagnetic solenoid arranged on energisation to close said valve, spring means urging said valve to the open position, friction braking means on said wheels, a brake pedal having an operative connection with said friction braking means, a switch on said brake pedal, arranged to close before operation of said friction braking means whereby closure of said switch completes an electrical circuit to energise said solenoid and close said valve.

3. An exhaust braking system on a motor vehicle having an internal combustion engine in driving connection with the wheels and a foot pedal actuating friction braking means on said wheels, said system comprising a butterfly valve mounted in the exhaust conduit of the engine, an electromagnetic solenoid for closing said valve, spring means tending to open said valve, an electric switch operable by said foot pedal to complete an electric circuit energising said solenoid to close said valve.

4. An exhaust braking system as claimed in claim 3, wherein said circuit includes a relay which is energised by said switch to close contacts energising said solenoid.

5. An exhaust braking system as claimed in claim 3, wherein said vehicle has a clutch pedal for actuating means for disengaging said engine from driving connection with the wheels, and said clutch pedal having a switch connected in said electrical circuit to open said circuit when said clutch pedal is actuated.

6. An exhaust braking system is claimed in claim 3, wherein said circuit includes means for automatically reducing the electric current flow in said solenoid after the lapse of a predetermined interval of time after its energisation.

7. An exhaust braking system as claimed in claim 6, wherein said current-reducing means comprise a resistor in series with a solenoid controlling a further switch, said further switch being arranged to short-circuit said resistor initially, but to be opened by said solenoid after said predetermined interval of time.

References Cited in the file of this patent
UNITED STATES PATENTS

| | | |
|---|---|---|
| 1,883,686 | Geiger | Oct. 18, 1932 |
| 1,940,712 | Ertz | Dec. 26, 1933 |
| 2,168,232 | Messinger | Aug. 1, 1939 |
| 2,216,138 | Sellers | Oct. 1, 1940 |
| 2,471,690 | Howland | May 31, 1949 |